US012687477B2

(12) United States Patent
Almajid et al.

(10) Patent No.: US 12,687,477 B2
(45) Date of Patent: Jul. 21, 2026

(54) METHOD OF ROBUST SURFACTANT SCREENING FOR FOAM APPLICATIONS

(71) Applicant: SAUDI ARABIAN OIL COMPANY, Dhahran (SA)

(72) Inventors: Muhammad M. Almajid, Dhahran (SA); Zuhair Alyousif, Dhahran (SA); Subhash C. Ayirala, Dhahran (SA); Othman Alswaie, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 351 days.

(21) Appl. No.: 18/362,717

(22) Filed: Jul. 31, 2023

(65) Prior Publication Data

US 2025/0044207 A1    Feb. 6, 2025

(51) Int. Cl.
*G01N 13/02* (2006.01)

(52) U.S. Cl.
CPC ....... *G01N 13/02* (2013.01); *G01N 2013/025* (2013.01)

(58) Field of Classification Search
CPC .......................... G01N 13/02; G01N 2013/025
(Continued)

(56) References Cited

U.S. PATENT DOCUMENTS

| | | | |
|---|---|---|---|
| 3,568,771 A | 3/1971 | Vincent et al. | |
| 4,148,217 A | 4/1979 | Engle | |

(Continued)

FOREIGN PATENT DOCUMENTS

| | | |
|---|---|---|
| CA | 3086132 A1 | 1/2021 |
| CN | 206804269 U | 12/2017 |

(Continued)

OTHER PUBLICATIONS

Al Yousef et al., "Surfactant and a mixture of surfactant and nanoparticles to stabilize CO2/brine foam, control gas mobility, and enhance oil recovery", Journal of Petroleum Exploration and Production Technology, 10(2), pp. 439-445, 2020 (27 pages).

(Continued)

*Primary Examiner* — Peter J Macchiarolo
*Assistant Examiner* — Rodney T Frank
(74) *Attorney, Agent, or Firm* — Osha Bergman Watanabe & Burton LLP

(57) ABSTRACT

Screening multiple surfactants is performed by a screening method including passing foam compositions comprising a surfactant through a porous media while measuring pressure drop across the porous media until a first steady state pressure drop is achieved. Magnitude and frequency in oscillations of the first steady state pressure are measured. A gas is injected through the porous media while measuring the pressure drop across the porous media until a second steady state pressure drop is achieved. Magnitude and frequency in oscillations of the second steady state pressure drop are measured. Foam stability is determined based on the first steady state pressure drop, second steady state pressure drop, and magnitude and frequency of oscillations during the first and second steady states. Secondary oil recovery may include injecting a foam composition into an oil-containing reservoir, wherein the foam composition is based on results of the screening and properties of the oil-containing reservoir.

10 Claims, 8 Drawing Sheets

(58) Field of Classification Search

USPC .......................................................... 73/60.11

See application file for complete search history.

(56) References Cited

U.S. PATENT DOCUMENTS

| | | | | |
|---|---|---|---|---|
| 4,562,727 | A | | 1/1986 | Dilgren et al. |
| 4,570,711 | A | | 2/1986 | Falls et al. |
| 4,589,276 | A | | 5/1986 | Djabbarah |
| 4,597,442 | A | | 7/1986 | Dilgren et al. |
| 4,601,336 | A | | 7/1986 | Dilgren et al. |
| 4,852,653 | A | | 8/1989 | Borchardt |
| 5,060,727 | A | * | 10/1991 | Schramm ............... C09K 8/594 166/275 |
| 5,203,411 | A | * | 4/1993 | Dawe ....................... C09K 8/58 166/275 |
| 5,542,474 | A | | 8/1996 | Djabbarah et al. |
| 10,451,531 | B2 | | 10/2019 | Potty et al. |
| 10,830,026 | B2 | | 11/2020 | Gassara et al. |
| 10,845,322 | B2 | | 11/2020 | Adebayo |
| 2014/0110117 | A1 | * | 4/2014 | Abbas ................... E21B 43/164 166/300 |
| 2017/0044422 | A1 | * | 2/2017 | Abbas ..................... C09K 8/584 |
| 2020/0249182 | A1 | * | 8/2020 | Adebayo ............... E21B 49/005 |
| 2025/0044207 | A1 | * | 2/2025 | Almajid ................. G01N 13/02 |

FOREIGN PATENT DOCUMENTS

| | | |
|---|---|---|
| CN | 109580454 B | 2/2022 |
| WO | 2016/075504 A1 | 5/2016 |

OTHER PUBLICATIONS

Memon et al., "Study of blended surfactants to generate stable foam in presence of crude oil for gas mobility control", Journal of Petroleum Exploration and Production Technology, 7(1), pp. 77-85, 2017 (31 pages).

Nasr et al., "A comparison of foam stability at varying salinities and surfactant concentrations using bulk foam tests and sandpack flooding", Journal of Petroleum Exploration and Production Technology, 10(2), pp. 271-282, 2020 (12 pages).

Memon et al., "Surfactant screening to generate strong foam with formation water and crude oil", Journal of Petroleum Exploration and Production Technology, 11(9), pp. 3521-3532, 2021 (12 pages).

Kartini et al., "Evaluation of Surfactant Mixture for Supercritical Carbon Dioxide Foamed Acid in Carbonate Matrix Acidizing", Energies, 14(20), 6567, 2021 (18 pages).

Eftekhari et al., "Effect of Foam on Liquid Phase Mobility in Porous Media", Scientific Reports, 7(1), pp. 1-8, 2017 (8 pages).

Jones, S.A. et al., "Small Core Flood Experiments for Foam EOR—Screening Surfactant Applications", InIOR 2015—18th European Symposium on Improved Oil Recovery, European Association of Geoscientists & Engineers, 2015 (11 pages).

Tsau, JS et al., "Evaluation of Surfactants for CO2—Foam Mobility Control", SPE-24013, SPE Permian Basin Oil and Gas Recovery Conference, 1992 (9 pages).

Hanamertani et al., "Ionic Liquid Application in Surfactant Foam Stabilization for Gas Mobility Control", ACS Publications, Energy & Fuels, 2018 (43 pages).

Memon et al., "Impact of new foam surfactant blend with water alternating gas injection on residual oil recovery", Journal of Petroleum Exploration and Production Technology, 7(3), pp. 843-851, 2017 (9 pages).

Zhong et al., "New Screening Criteria for Selection of Acid-Foam Surfactants", Petroleum Society of CIM, Paper No. 90-92, 1999 (16 pages).

Boeije et al., "A Methodology for Screening Surfactants for Foam Enhanced Oil Recovery in an Oil-Wet Reservoir", SPE-185182, SPE Reservoir Evaluation & Engineering, pp. 795-808, 2017 (14 pages).

International Search Report issued for corresponding international patent application No. PCT/US2024/040300, mailed Nov. 8, 2024 (6 pages).

Written Opinion issued for corresponding international patent application No. PCT/US2024/040300, mailed Nov. 8, 2024 (11 pages).

A.S. Hanamertani, et al., "The effects of in-situ emulsion formation and superficial velocity on foam performance in hgih-permeability porous media," Fuel, 2021 (14 pages).

* cited by examiner

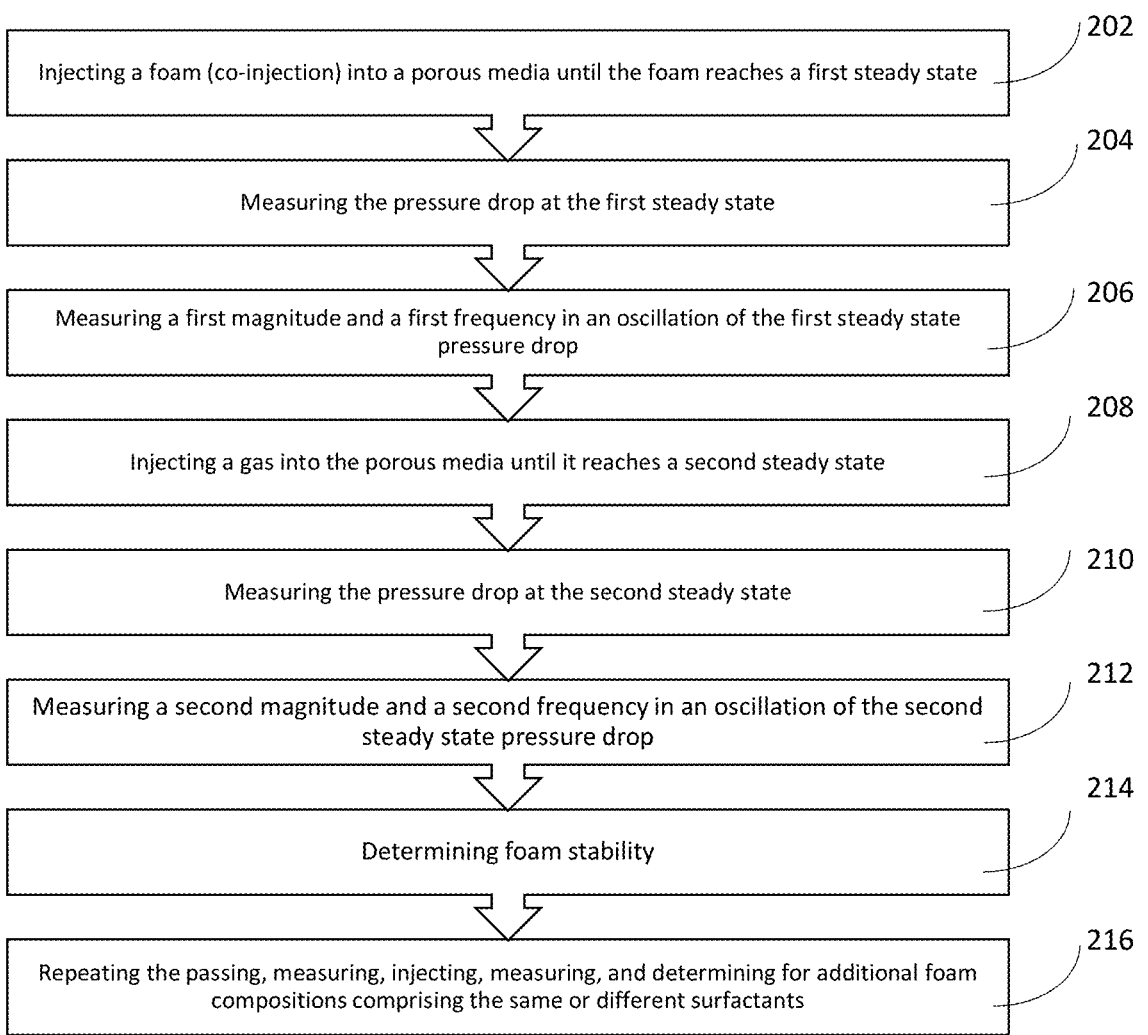

Injecting a foam (co-injection) into a porous media until the foam reaches a first steady state — 202

Measuring the pressure drop at the first steady state — 204

Measuring a first magnitude and a first frequency in an oscillation of the first steady state pressure drop — 206

Injecting a gas into the porous media until it reaches a second steady state — 208

Measuring the pressure drop at the second steady state — 210

Measuring a second magnitude and a second frequency in an oscillation of the second steady state pressure drop — 212

Determining foam stability — 214

Repeating the passing, measuring, injecting, measuring, and determining for additional foam compositions comprising the same or different surfactants — 216

FIG. 2

METHOD OF ROBUST SURFACTANT SCREENING FOR FOAM APPLICATIONS

BACKGROUND

The petroleum industry has recognized for decades that only a portion of the original oil in place in oil-bearing reservoirs is produced by natural mechanisms. Generally, there are three types of oil extraction and recovery from an oil well, namely primary, secondary, and tertiary recovery. During the primary recovery stage, hydrocarbons may be driven from a well through one or more natural mechanisms, for example, water displacing oil, expansion of natural gas in a reservoir, or gravity drainage resulting from the movement of oil within the reservoir. During the secondary recovery stage, external energy is provided to a reservoir, for example, through injecting fluids into a wellbore or rock formation to increase reservoir pressure, which increases or replaces the natural reservoir drive. It is also well-known that conventional methods of supplementing natural recovery are relatively inefficient. Typically, a reservoir may retain half of its original oil in place even after the application of currently available methods of secondary recovery. During the tertiary or enhanced oil recovery (EOR) stage, thermal methods or chemical methods (or combinations of both) may be used, for example, to reduce viscosity of oil for easier recovery from a well.

Well stimulation enables the improved extraction of hydrocarbon reserves that conventional recovery processes, such as gas or water displacement, cannot access. Foaming of injected gas is one effective method to alter mobility for oil recovery enhancement. The generation and the stability of a foam depends largely on the type of surfactant used. Choosing the optimal surfactant is a challenging task because typical bulk foam tests do not translate well to porous media behavior of the foam.

TECHNICAL FIELD

The present invention relates to a process for improving oil recovery in reservoirs. More specifically, embodiments of the present invention utilize a surfactant screening method for selecting suitable surfactants for foam compositions to use under reservoir conditions. Improving the surfactant used for oil recovery efforts within a particular reservoir may increase the probability of success for any foam application in the reservoir.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for secondary oil recovery. The method includes screening multiple surfactants using a screening method. The screening method includes passing a foam composition comprising a surfactant through a porous media while measuring a pressure drop across the porous media until a first steady state pressure drop across the porous media is achieved. A first magnitude and a first frequency in an oscillation of the first steady state pressure drop are measured. The method then includes injecting a gas through the porous media while measuring the pressure drop across the porous media until a second steady state pressure drop across the porous media is achieved, and measuring a second magnitude and a second frequency in an oscillation of the second steady state pressure drop. A foam stability of the foam composition comprising the surfactant is then determined based on the first steady state pressure drop, the second steady state pressure drop, and the first magnitude and first frequency of the oscillations of the first steady state pressure drop, and the magnitude and second frequency of the oscillations of the second steady state pressure drop. The passing, measuring, injecting, measuring, and determining is repeated for additional foam compositions comprising the same or different surfactants. Secondary oil recovery is then performed by injecting a foam composition into an oil-containing reservoir, wherein the foam composition is based on results of the screening and properties of the oil-containing reservoir.

In another aspect, embodiments herein relate to a method of screening foam compositions for use in secondary oil recovery processes. The screening method includes passing a foam composition comprising a surfactant through a porous media while measuring a pressure drop across the media until a first steady state pressure drop across the porous media is achieved and measuring a first magnitude and a first frequency in an oscillation of the first steady state pressure drop over a first period of time. A gas is then injected through the porous media while measuring the pressure drop across the porous media until a second steady state pressure drop across the porous media is achieved and measuring a second magnitude and a second frequency in an oscillation of the second steady state pressure drop over a second period of time. The screening method further includes determining a foam stability of the foam composition comprising the surfactant based on the first steady state pressure drop, the second steady state pressure drop, and the magnitude and frequency of the oscillations of the second steady state pressure drop, and repeating the passing (i), measuring (ii), injecting (iii), measuring (iv), and determining (v) for additional foam compositions comprising the same or different surfactants.

Embodiments herein further relate to a method for secondary oil recovery. The method includes measuring one or more properties of a formation including porosity and rock type, selecting a foam composition based on the screening as outlined in the paragraph above, and the one or more properties of the formation. The foam composition is then injected into the formation.

Still further, embodiments herein relate to a system for screening surfactants to use in foams used for secondary oil recovery. The system includes a porous media, a first injector, and a second injector. The first injector is configured to inject a liquid comprising a surfactant into the porous media, and the second injector is configured to inject a gas into the porous media. The system further includes a pressure measurement device configured to record pressure drop in the porous media, as well as a computing system configured to compute mobility reduction factor by using pressure drop measurements. The system further includes timer configured to measure a duration of time for the pressure drop to reach steady state, and an oscillation measuring device, configured to measuring a frequency and a magnitude of pressure oscillations. In some embodiments, the timer and oscillation measuring device are integral with the computing system, wherein the computing system is configured to measure a duration of time for the pressure drop to reach steady state and to measure a frequency and a magnitude of oscillations in the pressure drop at steady state.

The details of one or more implementations are set forth in the accompanying drawings and the description. Other features and advantages will be apparent from the description and drawings, and from the claims.

BRIEF DESCRIPTION OF DRAWINGS

Certain embodiments of the disclosure will be described with reference to the accompanying drawings, where like reference numerals denote like elements. It should be understood, however, that the accompanying figures illustrate the various implementations described and are not meant to limit the scope of various technologies described.

FIG. 2 is a process flow chart of the surfactant screening method according to one or more embodiments.

DETAILED DESCRIPTION

Figure 1:
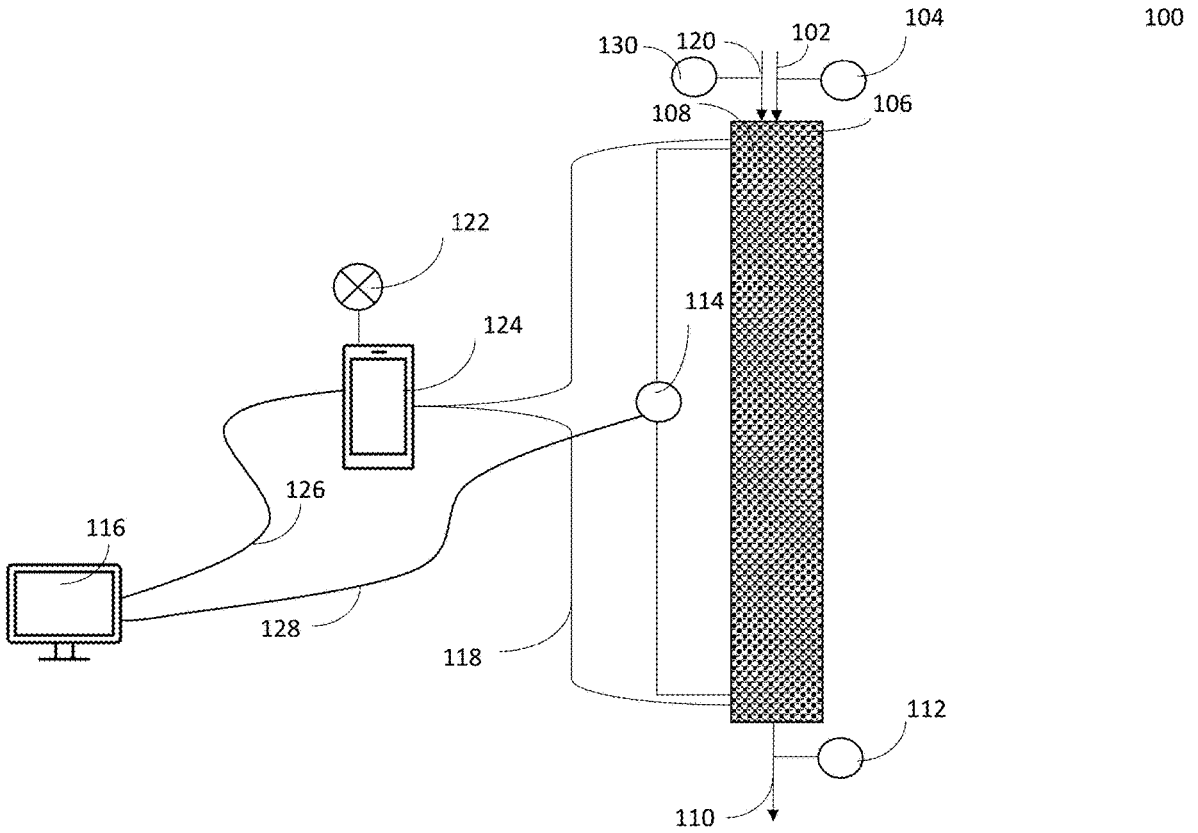
FIG. 1 illustrates a schematic diagram of a surfactant screening system according to one or more embodiments.
Figure 3:
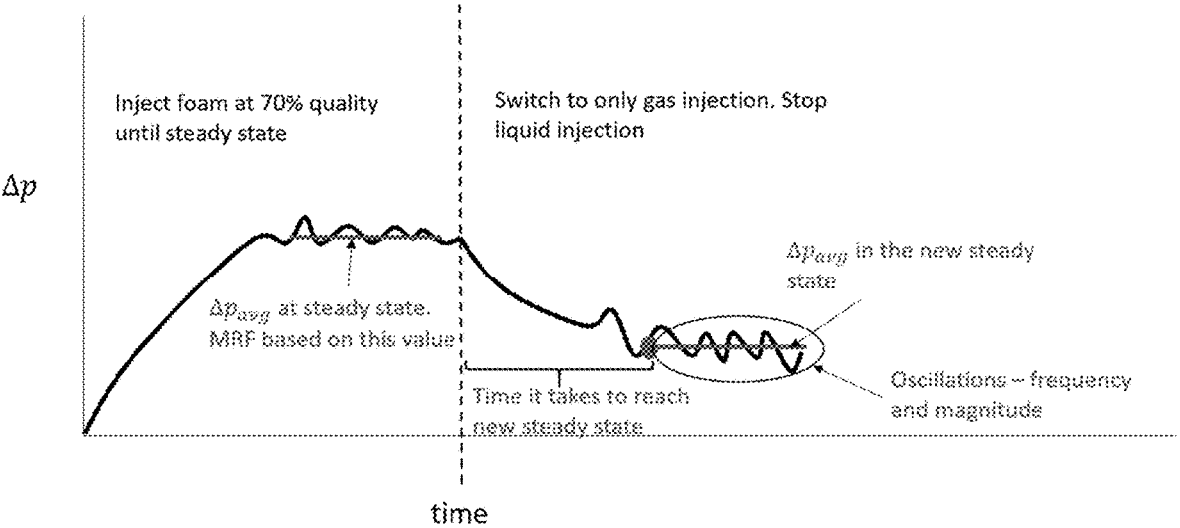
FIG. 3 is a schematic of parameters measured during the surfactant screening procedure according to one or more embodiments.

In the following, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

In one aspect, embodiments herein relate to enhanced oil recovery operations, including foam injection into a reservoir to enhance oil mobility. Several factors make choosing the right surfactant for the reservoir of interest complicated. The charge of the surfactant, the charge of the rock surface, the salinity of the water, the presence of oil, the amount of water present, and the amount of different minerals present are some of the factors that make the selection of a suitable surfactant difficult.

In another aspect, embodiments herein relate to systems and methods for screening surfactants for use in foams for enhanced oil recovery processes. The system used for screening surfactants includes a porous media, a first injector, a pressure measurement device, a second injector, and a computing system.

The first injector may be configured to inject a foam comprising a surfactant into the porous media. Alternatively, the first injector may be a system for injecting a surfactant solution into the porous media while the second injector may be used to co-inject a gas, such as nitrogen or carbon dioxide, used for foaming of the foaming composition. The second injector may, as noted above, be configured to inject a gas or other fluids, such as water, into the porous media; in some embodiments a third injector may be provided for water or other injections used for testing.

The pressure measurement device may be configured to measure a pressure drop of the injected foam or other fluids through or across the porous media, and may include, for example, an upstream pressure measurement device and a downstream pressure measurement device, from which the computing system may calculate the differential pressure, or may include a differential pressure gauge/transmitter for directly measuring the pressure differential and transmitting the measured value to the computing system.

The system may also include reservoirs for containing the surfactant solution, the gas, and water used for the injections, as well as appropriate pumps, valving and other associated equipment to control the respective injections. As the systems and methods herein use oscillations in the steady state pressure drop to determine efficacy of a surfactant or stability of a foam, reciprocating pumps, if used, should include appropriate pressure dampeners.

The computing system may be configured to compute a mobility reduction factor of a foam by using the pressure drop measurements. The computer system may also be configured to determine or measure the time it takes for the pressure drop to reach steady state following the start of an injection, such as a foam or a gas, such as using a recorded pressure drop as a function time. The computer system, or an oscillation measuring device, may also be configured to measure a frequency and a magnitude of oscillations in the pressure drop across the porous media at steady state.

Foam flow through the porous media may be established by injection of a foam, or co-injection of a surfactant solution and a gas, such as carbon dioxide or nitrogen, among others. Three parameters are then measured and used to indicate the level of foam stability in the porous media, including (i) the duration of time it takes to reach a new steady state following start of an injection, (ii) the average pressure drop value at the new steady state, and (iii) the characteristics, such as frequency and magnitude, of oscillations in the pressure drop during the steady state period.

As shown in FIG. 1, the disclosed system 100 for screening surfactants includes a porous media 106, a first injector 102, a pressure measurement device 114, a second injector 120, a computer system 116, a timer 122, and an oscillation measuring device 124. The timer and oscillation measuring device may be integral with the computer, not provided as separate components.

In the exemplary embodiment shown in FIG. 1 an outlet line 110 is positioned at the opposite end of the porous media 106 and withdraws liquid, foam or gas passing from the porous media 106. A first flow measurement device 104 is on the first injector 102 that measures the flow rate of the foam being injected into the porous media 106. A second flow measurement device 112 is on the outlet line 110 that measures the flow rate of the foam being discharged from the porous media 106. The first injector 102 injects a foam comprising a surfactant into the porous media 106; in other embodiments, the first injector may be configured to inject a surfactant solution into the porous media while a gas is coinjected for foam generation. The pressure measurement device 114 measures pressure drop across the porous media 106. The second injector 120 injects a gas into the porous media 106. A computer system 116 computes a mobility reduction factor by using pressure drop measurements via the pressure measurement device 114. The pressure measurement data is transmitted to the computer system 116 from the pressure measurement device 114 through a first transmission line 128. The timer 122 or computer system 116 measures the time it takes for the pressure drop to reach a steady state. The oscillation measuring device 124, or computer system 116, measures the frequency and magnitude of oscillations in the measured pressure drop at steady state.

In other embodiments, the various components may be configured in different arrangements in accordance with the knowledge of one of ordinary skill in the art.

In one or more embodiments, the disclosed system 100 for screening surfactants may be operated at room temperature. In other embodiments, the system 100 for screening surfactants may be operated at a higher temperature simulating the formation temperature, using a heated and insulated cabinet around the system 100. Methods herein are generally independent of system temperature. Heated systems may impact foam stability, destroying the foam quicker, however so long as similar experiment temperatures are used when comparing test results, the experimental results provide for apt comparisons of surfactants and foam systems according to methods herein.

Methods for screening multiple surfactants, according to embodiments herein, include passing a foam composition comprising a surfactant through a porous media while measuring a pressure drop across the porous media until a first steady state pressure drop across the porous media is achieved. The method then includes measuring a first magnitude and a first frequency in an oscillation of the first steady state pressure drop. The method then includes injecting a gas through the porous media while measuring the pressure drop across the porous media until a second steady state pressure drop across the porous media is achieved. The method further includes measuring a second magnitude and a second frequency in an oscillation of the second steady state pressure drop. The method includes determining a foam stability of the foam composition comprising the surfactant based on the first steady state pressure drop, the second steady state pressure drop, and the first magnitude and first frequency of the oscillations of the first steady state pressure drop, and the magnitude and second frequency of the oscillations of the second steady state pressure drop. The method includes repeating the passing, measuring, injecting, measuring, and determining for additional foam compositions comprising the same or different surfactants.

As noted above, the charge of the surfactant, the charge of the rock surface, the salinity of the water, the presence of oil, the amount of water present, and the amount of different minerals present may impact foam stability. Embodiments herein may also include performing the screening as described above over multiple porous media. The method may also include injecting a foam composition into an oil-containing reservoir, wherein the foam composition used is based on results of the screening and properties of the oil-containing reservoir.

As shown in FIG. 2, the method for screening multiple surfactants includes several steps. In step 202, the method includes injecting a foam (co-injection) into a porous media until the foam reaches a steady state. The foam composition may comprise a surfactant. In step 204, the method includes measuring the pressure drop across the porous media until a first steady state pressure drop across the porous media is achieved. In step 206, the method then includes measuring a first magnitude and a first frequency in an oscillation of the first steady state pressure drop. In step 208, the method includes injecting a gas into the porous media while measuring the pressure drop across the porous media until a second steady state pressure drop across the porous media is achieved. In step 210, the method includes measuring the pressure drop at the second steady state. In step 212, the method includes measuring a second magnitude and a second frequency in an oscillation of the second steady state pressure drop. In step 214, the method then includes determining the foam stability of the foam composition comprising the surfactant based on the first steady state pressure drop, the second steady state pressure drop, and the first magnitude and first frequency of the oscillations of the first steady state pressure drop, and the magnitude and second frequency of the oscillations of the second steady state pressure drop. Finally, in step 216, the method includes repeating the passing, measuring, injecting, measuring, and determining for additional foam compositions comprising the same or different surfactants.

The disclosed method may further include injecting a foam composition into an oil-containing reservoir through a wellbore, wherein the foam composition is based on the results of the screening and properties of the oil-containing reservoir (not shown in FIG. 2).

In one or more embodiments, the disclosed surfactant screening method may be utilized for establishing a suitable surfactant or the most optimal surfactant to be used during a secondary oil recovery process, such as $CO_2$ or $N_2$-foam flooding. Several factors may contribute to choosing the right surfactant for the reservoir of interest. Such factors may include but are not limited to: the charge of the surfactant, the charge of the rock surface, the salinity of the water, the presence of oil, the amount of water present, and the amount of different minerals present. The disclosed method may include preparing a foaming composition based on the screening results and the reservoir parameters, and then injecting the foaming composition into a reservoir for effective oil recovery.

Porous Media

As disclosed above, the surfactant screening system includes a porous media 106. The porous media 106 may be selected from a core, or a sand pack, or a microfluidic device, and may include a plurality of pores 108. The porous media 106 may have a shape of a cylinder. The porous media 106 may have a porosity and a structure similar to the natural rock formation of a reservoir. Rocks of an oil reservoir may have a combination of different materials such as clay and minerals. The pore content of a reservoir rock such as the sizes of pores, and density of pores in a media may be indicative of the fluid transport through the reservoir. Fluid flow in a reservoir is, therefore, a function of porosity and permeability. Rock properties around a wellbore may determine the extent of wellbore fluid flow for production. The porous media 106 may be selected based on the properties of a reservoir rock of an intended well, such that the porosity and permeability of the porous media mimics the reservoir rock. The porous media may be of an appropriate size, diameter and length, to provide indicative test results.

In one or more embodiments, the material of construction of the porous media 106 may be any permeable porous material. For a non-limiting example, the porous media may have a material selected from the list consisting of: sand, clay, stones, pack, core, and frit. Any material that is capable of providing an adequately realistic laboratory model of a subterranean reservoir may be used as a material for constructing the porous media column.

Foam

As used herein, the term "foam" refers to an emulsion of a dispersed gas phase in a continuous liquid phase stabilized using a surfactant or a foaming agent. In the present disclosure, nitrogen gas (N2) and carbon dioxide (CO2) are used as gas phases while water-based fluids are used as a liquid phase.

In one or more embodiments, the foaming composition for surfactant screening includes at least one surfactant. The surfactant may be selected for use in a particular downhole environment. As such, in one or more embodiments, the type of surfactant used may be selected based on its foamability, foam buildup, foam half-life, overflow of the foam, and thermal stability under the conditions in which it will be used. In one or more particular embodiments, the surfactant may be anionic, cationic, amphoteric (or zwitterionic), or nonionic, and combinations thereof.

In one or more embodiments, the surfactant may be thermally stable at a temperature of 250° F. or more, 300° F. or more, 350° F. or more, or 375° F. or more, as measured by thermogravimetric analysis (TGA). The TGA measurement method as used herein measures the change in the weight of a specimen with a change in the temperature, and the thermal stability is calculated based on the weight loss and the heat transfer rate of the material.

In one or more embodiments, the surfactant may be highly soluble in aqueous solutions, such as in deionized water, seawater, brines, calcium chloride solutions, and the like, and also highly soluble in oils. In some embodiments, the surfactant may be soluble in both aqueous solutions and oils in an amount of 10% by weight (wt. %) or more, 20 wt. % or more, 30 wt. % or more, or 40 wt. % or more at ambient temperature. In some embodiments, the solubility of the surfactant may increase with increasing temperature.

In one or more embodiments, the surfactant for screening may be present in the foam composition in an amount of about 0.05 vol/vol % to 20 vol/vol %. For example, the surfactant may be present in the foam composition from a lower limit of about 0.05, 0.1, 0.2. 0.5. 0.8, 1, 2, 3, 4, or 5 vol/vol % to an upper limit of 2, 3, 4, 5, 10, 15, or 20 vol/vol %, where any lower limit may be combined with any mathematically compatible upper limit.

The foam composition according to one or more embodiments may include a liquid carrier, a surfactant, and a gas. In some embodiments, the liquid carrier may be water. The carrier fluid may be an acid stimulation fluid or an enhanced oil recovery (EOR) fluid, among others. In general, the base fluid that the surfactant is added to could be any fluid that is compatible with the addition of the surfactant. In one or more embodiments, the carrier fluid may include at least one of freshwater, seawater, brine, water-soluble organic compounds, and mixtures thereof. The carrier fluid may contain freshwater formulated to contain various salts. The salts may include but are not limited to, alkali metal halides and hydroxides. In one or more embodiments, the aqueous fluid may be a brine that may be any of seawater, aqueous solutions wherein the salt concentration is less than that of seawater, or aqueous solutions wherein the salt concentration are greater than that of seawater. Salts that are found in seawater may include sodium, calcium, aluminum, magnesium, potassium, strontium, and lithium salts of halides, carbonates, chlorates, bromates, nitrates, oxides, phosphates, among others. Any of the aforementioned salts may be included in brine. In one or more embodiments, the density of the carrier fluid may be controlled by increasing the salt concentration in the brine, though the maximum concentration is determined by the solubility of the salt. In one or more embodiments, the quality of water as the carrier fluid may not significantly reduce foam stability. The rate of foam drainage may depend on multiple factors including temperature, the viscosity of the liquid phase, and the surfactant concentration.

In one or more embodiments, the foamability of the surfactants may be dependent on the salinity of the aqueous fluid. The addition of salts in the fracturing fluid composition may alter the critical micelle concentration (CMC) of surfactants, and therefore, may change the behavior of the fracturing fluid composition. As used herein, CMC refers to the concentration of the surfactant above which micelles form, and all additional surfactants added to the system will form micelles. The addition of salts may influence the aqueous surfactant solution by modifying the intra-micellar and inter-micellar interactions, and therefore, may affect the phase behavior of foam. In one or more embodiments, the foamability of the foaming composition at a high salinity system may be dependent on the surfactant concentration. The foamability of the fracturing fluid may be insensitive to the surfactant concentration at a high surfactant concentration. For a non-limiting example, the foamability of the tested surfactant may be insensitive to the surfactant concentration when the surfactant concentration is at least 0.025 wt. %. At a low surfactant concentration of less than 0.025 wt. %, foam stability of the foaming composition may be affected by the salinity of the fluid.

The foaming composition of one or more embodiments may further comprise one or more chemicals selected from the group consisting of: acids, corrosion inhibitors, antisludge chemicals, and chelating agents. Any acid suitable for wellbore applications may be selected. Corrosion inhibitors are surface-active compounds that form protective coatings on the surface of metal components, which come in contact with corrosive environments and thus suppress corrosion. Any corrosion inhibitor known to one person skilled in the art may be incorporated into the foaming composition. Non-limiting examples of such corrosion inhibitors may include amines, condensation products of fatty acids with polyamines, e.g. imidazolines or polyamides, quaternary ammonium compounds, silicate salts, phosphate salts, etc. Any anti-sludge chemical known to one person skilled in the art may be incorporated into the foaming composition. Non-limiting examples of such anti-sludge chemicals include surfactants, blends of cationic and nonionic surfactants, anionic surfactants, blends of anionic and nonionic surfactants, and salts of surfactants. For an example, both dodecyl benzene sulfonic acid (DDBSA), and salts of dodecyl benzene sulfonic acid (DDBSA) may be used as anti-sludge chemicals. Any chelating agent known to one person skilled in the art may be incorporated into the foaming composition. Non-limiting examples of such chelating agents may be diethylenetriamene pentaacetate (DTPA), ethylenediaminetetraacetic acid (EDTA), tetrasodium glutamate diacetate (GLDA), and their derivatives.

Foam Preparation

As noted above, foaming composition described herein includes a gas. The foaming composition may be prepared by flowing gas into a liquid solution. The liquid solution includes the components as described above. The inert gas may be nitrogen gas ($N_2$) or carbon dioxide gas ($CO_2$). In some instances, air may be used for generating foams in a fracturing fluid composition. According to embodiments herein, the foaming composition may be prepared in several ways.

In one or more embodiments, a mixture containing a surfactant and a liquid carrier may be prepared by any suitable mixing method known in the art. Next, the mixture is sparged with an inert gas while shear mixing generates a foamed composition. The foaming composition may be generated by passing gas into the mixture while shearing the mixture under a certain shear rate. As gas bubbles form inside the fluid mixture, the surfactant helps generate and stabilize foam under a range of temperatures and pressure.

The foaming composition may also be prepared by simultaneously mixing a surfactant with a liquid carrier while being sheared at a certain rate and passing gas into the mixture simultaneously. Any other chemical may be added to the foaming composition in any order. Standard mixing techniques may be used.

In certain applications, for instance when nanoparticles are used in the compositions, care should be taken to avoid premature formation of aggregates during the preparation of the surfactant solution.

The gas flow rate, time of flowing gas, and amount of gas needed to generate foam in a fluid may depend on the environment such as temperature and pressure, fluid properties including but not limited to the fluid density, viscosity, and present solid particles. Nitrogen gas may be particularly suitable for generating foam due to its chemical inertness and relative abundance.

The volume of a foamed fluid vs the volume of the fluid prior to generating the foam may determine the effectiveness of gas in forming a foam. If insufficient gas is included in a fracturing fluid formulation, the gas bubbles in the fluid may be spherical and may not be in contact with each other. In such instances, the viscosity of the foamed fluid may be low as gas bubbles in a foamed fluid are responsible for creating a resistance in the free fluid flow. If enough gas is included in a fracturing fluid formulation, the volume of gas bubbles present in the foamed fracturing fluid may be large, and therefore, the foam quality may be considered high. In such foamed fracturing fluids, the gas bubbles may be in contact with each other and therefore, lose spherical shapes. This enhanced resistivity in fluid flow may cause the viscosity of the foamed fluid to increase.

Foam Quality

The foaming composition of one or more embodiments includes a gas. The volume of a foaming composition vs the volume of the fluid prior to generating the foam may determine the effectiveness of gas in forming a foam. If insufficient gas is included in a fracturing fluid formulation, the gas bubbles in the fluid may be spherical and may not be in contact with each other. In such instances, the viscosity of the foamed fluid may be low as gas bubbles in a foamed fluid are responsible for creating resistance in the free fluid flow. If enough gas is added to the foaming composition, the volume of gas bubbles present in the foaming composition may be large, and therefore, the foam quality may be considered high. In such a foaming composition, the gas bubbles may be in contact with each other and therefore, lose spherical shapes. This enhanced resistivity in fluid flow may cause the viscosity of the foamed composition to increase.

The term "foam quality" refers to a ratio of gas volume to foam volume (gas+liquid) at a certain pressure and temperature. Foam quality under certain pressure and temperatures may be determined by measuring the ratio between gas volume and the total foam volume including gas and liquid phases. Form quality may be used as an important factor in determining foam stability and viscosity. As used herein, foam quality (I) as defined above is the ratio of gas volume to gas/liquid volume over a given temperature and pressure, and may be determined using Equation (I) below:

$$\Gamma = \frac{100 V_g}{V_g + V_l} \tag{I}$$

where $V_g$ is the gas volume and $V_l$ is the liquid volume.

In one or more embodiments, the foaming composition may comprise a foam quality of 30 to 90%, where the % is given as the volume of the gas-free liquid fracturing fluid solution to the volume of the gas occupied in a foam. In foams that have a foam quality below about 30%, gas bubbles do not generally come in contact with each other. These foams have low foam viscosity and include a large volume of free liquid. Foam qualities in a range from 30% to 90% may indicate a foam in which gas bubbles are in contact with each other, resulting in an increased foam viscosity. In one or more embodiments, foams of the present disclosure may have a foam quality in a range from 30% to 90%. For example, the foam quality of disclosed foams may have a value range having a lower limit of one of 30, 35, 40, 45, 50, 55, 60, 65, and 70% and an upper limit of one of 60, 65, 70, 75, 80, 85 and 90%, where any lower limit may be combined with any mathematically compatible upper limit.

Foam Injection

As disclosed above, the surfactant screening system includes a first injector 102 that is configured to inject a foam comprising a surfactant into the porous media 106. A foaming composition may be first prepared at room temperature (e.g., 20-25° C.) by a method discussed above. The composition may be tested at room temperature, or may be heated to a temperature to simulate downhole conditions, such as a temperature in a range from 65 to 180° C. Alternatively, a foaming composition may be prepared at a simulated in-situ downhole temperature in a range from 65 to 180° C. by following a method discussed above. The first injector 102 may be configured to inject the foaming composition at temperature continuously or in a semi-batch or batch process. The first injector 102 may be positioned in the porous media 106 at the inlet end, or in the same direction as gravity. As disclosed above, the surfactant screening system also includes a second injector 120 that is configured to inject a gas into the porous media 106. The porous media 106 comprising a sand pack or a column of any permeable material may be arranged to receive and transport both the injected foaming composition from the first injector 102 and the injected gas from the second injector 120.

The first injector 102 may be operated manually, or automatically by the first flow measurement device 104. The flow rate of the foaming composition through the first injector 102 may depend upon the size of the test apparatus, but may be in a range from ml/h to gal/h. T The second injector 120 may be operated manually, or automatically by the gas flow measurement device 130. In one or more embodiments, the gas may be injected through the second injector 120 at constant mass flow rates proportioned to that of the foaming composition through the first injector 102.

A wide variety of pumps may be utilized to inject the foaming composition into the porous media 106 through the injectors. For example, pumps such as positive displacement pumps may be used to inject the foaming composition into the porous media 106. On the other hand, a tank of pressurized pure gas, such as nitrogen gas may be used to inject the gas into the porous media 106 through the second injector 120. The pressure of the tank may be reduced to a pre-set value, and the flow rate may be measured using the gas flow measurement device 130.

Steady State

As disclosed above in the description of FIG. 2, the method includes injecting a foaming composition into a porous media until the foam reaches a first steady state. As used herein, the term "steady state" refers to a condition where the fluid properties at a point in the porous media do not change over time. When the foam reaches a steady state, the fluid pressure at any given point of the porous media remains constant over time. The first steady state for foam may be measured by routinely measuring the pressure drop between the inlet and the outlet of the porous media 106 via the pressure drop measuring device 114. When the pressure drop measurement device 114 measures the same value repeatedly at a different time for the same foaming composition, it may then be considered that the foaming composition has reached its steady state in the porous media 106. Steady state is a function of the porous medium used, the fluids injected, and the resulting interactions between fluids and solids, among other factors. The measured pressure drop gives an indication of whether the system is in the steady state region.

Gas Injection

As disclosed already, the method includes injecting a gas into the porous media 106 until it reaches a second steady state. The gas may be a pure gas, and, or an inert gas. The inert gas may be nitrogen gas ($N_2$) or carbon dioxide gas ($CO_2$). In some instances, air may be used for injecting into the porous media. The gas flow rate, time of flowing gas, and amount of gas needed to run the test method may depend on the environment such as temperature and pressure, the foaming composition flow rate, duration of time of flowing the foaming composition, and amount of foaming composition being injected into the porous media, among other factors. Nitrogen gas may be particularly suitable for the test method due to its chemical inertness and relative abundance.

The gas may be injected into the porous media 106 in a direction similar to the direction of gravity, and in the same direction to the injection of the foaming composition. In some embodiments, the gas may be injected into the porous media 106 horizontally from the side of the cylindrical porous media body for production on the other side. Various configurations are thus possible to screen for surfactants.

After the foaming composition reaches the first steady state in the porous media 106, the gas may be gradually injected into the porous media 106 via the second injector 120. In one or more embodiments, the operating pump for controlling foam injection through the first injector 102 into the porous media 106 may be completely shut down before opening the second injector 120.

In other embodiments, the gas and liquid forming the foam may be co-injected, forming the foam in situ. Switching to gas-only injection may be accomplished by stopping flow from the liquid pump and increasing the gas rate to match the total injected rate of the prior injection period. The pressure drop is maintained by the gas due to the compressibility of the gas that compensates for any possible loss due to stopping of the liquid flow. It is anticipated that the decrease in pressure drop is attributable only to the increase of the gas within the system that makes the foam weaker.

The second steady state may similarly be measured by measuring the pressure drop between the inlet and the outlet of the porous media 106 via the pressure drop measuring device 114 during flow.

In one or more embodiments, the gas may be injected at a temperature range from 5° C. to 180° C., such as from 20 or 25° C. to 150° C. The pressure of the gas injection may be in a range from 1 bar (a) to 400 bar (a). The gas may be inert, or non-reactive.

In one or more embodiments, the second injector 120 may be connected to a flow-control valve (not shown) that is configured to reduce or increase the flow rate of the pure gas into the porous media 106.

Computing MRF

The disclosed method may also include utilizing the pressure drop data for computing a mobility reduction factor (MRF) for each surfactant screened by the surfactant screening system. MRF values are widely used in selecting suitable surfactants for the stabilization of bubble films or lamellae at reservoir conditions. MRF translates into one of the flowing properties of foam, which is the mobility reduction of foam in porous media. It is known that the mobility reduction of foam in a porous media is correlated with the stability of the foam. The MRF value generally increases with the reduction of interfacial tension between the gas phase and liquid phase in a foaming composition.

Mobility Reduction Factor (MRF) is defined by the ratio between the pressure drop of a foam and the pressure drop of a reference liquid when passed through the same porous media. The pressure drop ratio, $\Delta Pfoam/\Delta Pref$, may be considered as a relative and apparent viscosity of the generated foam at a given flow rate. The reference pressure drop may be pressure drop for any given reference liquid, such as water, or the pressure drop measured from a reference two-phase mixture such as a mixture of water and gas co-injection. The following equation is used to compute the MRF value for any given surfactant.

$$MRF = \frac{\Delta p^{foam}}{\Delta p^{no\,foam}}.$$

Here, $\Delta p^{foam}$ is the steady state pressure drop value reached following the coinjection period, while $\Delta p^{no\ foam}$ is the pressure drop reached when a reference liquid permeability is measured at the same mass flow rate.

The mobility reduction factor (MRF) may be estimated by measuring the steady-state pressure drop those results from using a surfactant during foam flooding. Comparing the steady-state pressure drop with respect to the single-phase water pressure drop across the same porous media, MRF value for a given surfactant may be determined. Conventionally, when a group of surfactants are screened, a surfactant may be selected solely based on the MRF ranking of the surfactants.

Time Measurement

As disclosed above, three parameters were identified to indicate the level of foam stability reached in porous media: (i) the time it takes to reach a new steady state, (ii) the pressure drop value at this steady state, and (iii) the frequency of oscillations during this period.

A first time measurement and a second time measurement may be taken via the time measurement device 122. The first time measurement may be the time it takes for the injected foaming composition to reach the first steady state. The second time measurement may be the time it takes for the injected gas to reach the second steady state. The disclosed method takes into consideration of at least two time measurements at two different steady states. Incorporating time measurements when measuring steady-state values may be beneficial in predicting performance with respect to mobility reduction over time for the tested surfactants and may provide a basis for comparison of the surfactants.

Oscillation Measurements

As disclosed above, the frequency and the magnitude of the oscillations are measured during the steady-state period. The oscillations occur because constant imbibition and drainage events occur in the porous media 106 causing generation and coalescence events. The oscillations observed during the steady-state periods of foam flow may be representative of how stable the foam system is. The more stable the foam system, the more resistant foam lamellae are to rupture, and the less oscillations are observed at the pressure drop value during the steady state. Therefore, the intensity of oscillations is indicative of how fast a foam can be broken, or how stable the foam is.

As disclosed, the method also may include injecting a foam with a selected surfactant (selected via the surfactant screening results obtained using system 100) into a reservoir for secondary oil recovery. In such cases, the screening test may involve using a porous media similar to the reservoir conditions.

EXAMPLES

A study was conducted to evaluate the effect of the ionic composition of the aqueous solution on the foam behavior, i.e., generation and stability. Three different surfactants were screened under four different ionic environments.

Materials

Three types of surfactants were used including an anionic surfactant, an amphoteric surfactant, and a nonionic surfactant. The anionic surfactant denoted as surfactant 1, contained alpha olefin sulfonate, isopropyl alcohol, and citrus terpenes. The amphoteric surfactant, denoted surfactant 2, contained amphoteric alkyl amine. Lastly, the nonionic surfactant was Neodol 25-12, which is a commercially available, 100% active nonionic surfactant, denoted as surfactant 3.

TABLE 1

| List of Surfactants and Concentrations Used | | | |
|---|---|---|---|
| Surfactant | Name | Concentration | Type |
| Surfactant 1 | Alpha olefin sulfonate | 5 gpt | Anionic |
| Surfactant 2 | Amphoteric alkyl amine | 5 gpt | Amphoteric |
| Surfactant 3 | Neodol 25-12 | 0.2 wt % | Nonionic |

Four brine compositions, W1, W2, W3, and W4 were used as follows. Each composition was used to investigate the effect of its individual ions on foam generation and stability. The aqueous ions used include sodium ions ($Na^+$), chloride ions ($Cl^-$), magnesium ions ($Mg^{2+}$), calcium ions ($Ca^{2+}$), and sulfate ions ($SO_4^{2-}$). Ionic solutions were prepared using sodium chloride (NaCl), calcium chloride ($CaCl_2$)), magnesium chloride ($MgCl_2$), and sodium sulfate ($Na_2SO_4$) salts.

TABLE 2

| Brine Compositions | | | | |
|---|---|---|---|---|
| Ions/Symbols | W1 (ppm) | W2 (ppm) | W3 (ppm) | W4 (ppm) |
| Sodium ($Na^+$) | 2265.8 | — | — | 1864.9 |
| Calcium ($Ca^{2+}$) | — | 2080.5 | — | — |
| Magnesium ($Mg^{2+}$) | — | — | 1470.6 | — |
| Sulfate ($SO_4^{2-}$) | — | — | — | 3896.1 |
| Chloride ($Cl^-$) | 3494.2 | 3680.5 | 4290.4 | — |
| TDS | 5760 | 5761 | 5761 | 5761 |

Carbon dioxide ($CO_2$) gas, industrial grade, was used for generating all foam samples.

Experimental Results

Figures 4A, 4B, 4C:
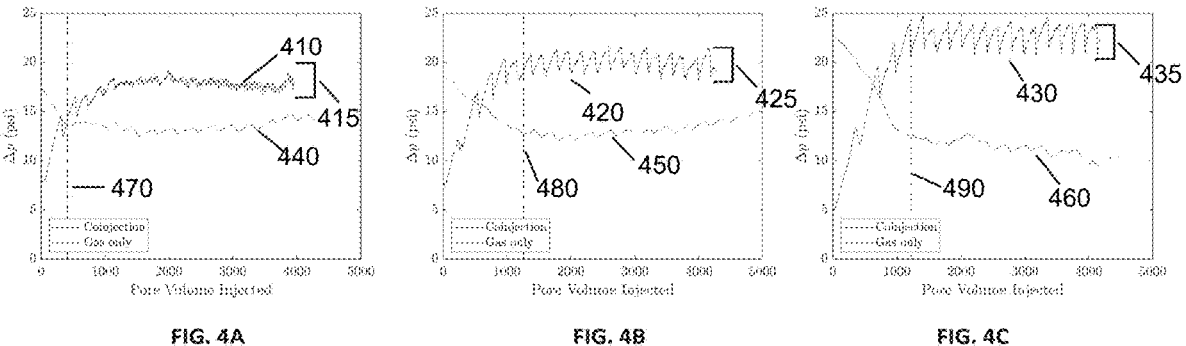
FIG. 4A graphically depicts a steady-state pressure drop obtained as a result of the coinjection period for foam composition comprising surfactant 1 in ionic solution W2 according to one or more embodiments.
FIG. 4B graphically depicts a steady-state pressure drop obtained as a result of the coinjection period for foam composition comprising surfactant 1 in ionic solution W3 according to one or more embodiments.
FIG. 4C graphically depicts a steady-state pressure drop obtained as a result of the coinjection period for foam composition comprising surfactant 1 in ionic solution W4 according to one or more embodiments.

As shown in the FIGS. 4A-4C, the pressure drop measurement were taken for foaming compositions generated using the same surfactant in three different aqueous mediums. FIG. 4A shows the pressure drop measurement for surfactant 1 in W2 medium, FIG. 4B shows the pressure drop measurement for surfactant 1 in W3 medium, and. FIG. 4C shows the pressure drop measurement for surfactant 1 in W4 medium. As shown in the figures, lines 410, 420, and 430 represent the pressure drop measurements during the coinjection period (foam injection) and lines 440, 450, and 460 represent the pressure drop measurements during the pure gas injection. The plots are generated with data starting from the zero pore volume injected point onwards. Additionally, the dashed black lines 470, 480 and 490 represent the onset of steady-state period following the pure gas injection period.

As shown in the FIGS. 4A-4C, the pressure drops during the coinjection period increased with pore volume of the porous media. This increase may occur due to lamellae generation which is a result of fluid/fluid and fluid/solid interaction during this period. The pressure drop increased until the foaming compositions reached a steady-state value.

As shown in the FIGS. 4A-4C, after that steady state period, some oscillations 415, 425, 435 were observed and measured in the pressure drop value. These oscillations may have occurred due to constant imbibition and drainage events causing generation and coalescence events. The oscillations measured during steady-state periods of foam flow may be representative of how stable the foam system was. The more stable the foam system was, the more resistant foam lamellae were to rupture, and the less oscillations were observed in the pressure drop value.

In contrast, during the pure gas injection period, the pressure drop slowly decreased as a result of lamellae thinning and eventual rupture, which lead to bubble coalescence. As the gas became more continuous, much of the gas mobility reduction gained by foam generation was lost. The pressure drop value decreased until a new steady-state value, beyond which the pressure drop value fluctuated in a similar fashion to the coinjection steady-state period. In the pure gas injection period, the capillary pressure may continue to increase until it reaches the limiting capillary pressure, where much coalescence occurs. Therefore, during pure gas injection, the oscillations may be more sensitive to how resistant foam lamellae are to thinning rather than an equilibrium between imbibition and drainage events that are present in the coinjection period.

Figure 5A:
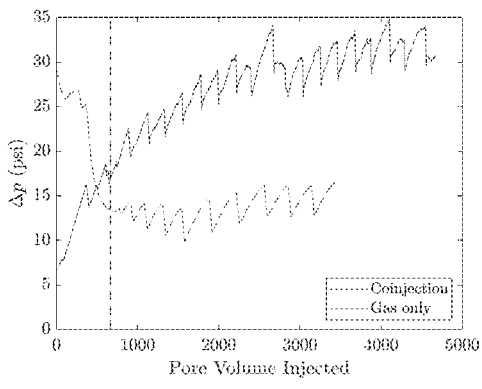
FIG. 5A graphically depicts a steady-state pressure drop obtained as a result of the coinjection period for foam composition comprising surfactant 2 in ionic solution W1 according to one or more embodiments.
Figure 5B:
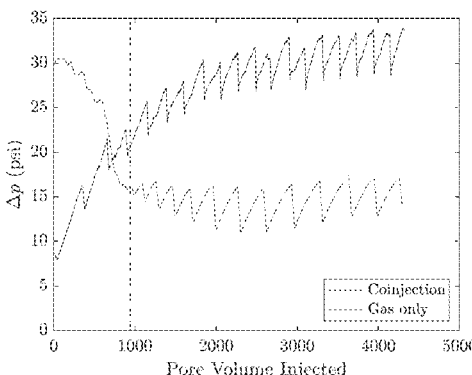
FIG. 5B graphically depicts a steady-state pressure drop obtained as a result of the coinjection period for foam composition comprising surfactant 2 in ionic solution W2 according to one or more embodiments.
Figure 6A:
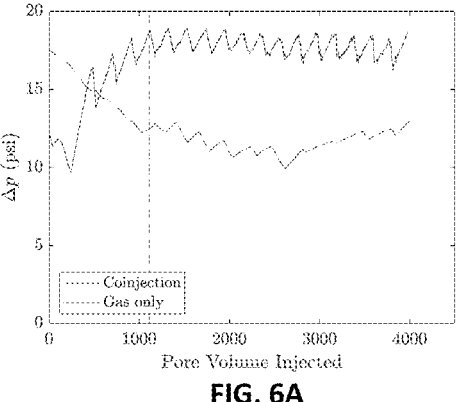
FIG. 6A graphically depicts a steady-state pressure drop obtained as a result of the coinjection period for foam composition comprising surfactant 3 in ionic solution W1 according to one or more embodiments.
Figure 6B:
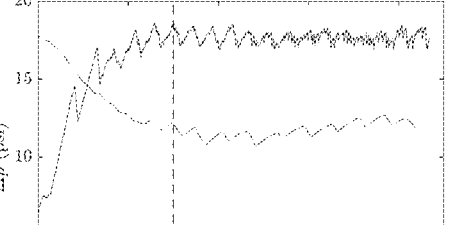
FIG. 6B graphically depicts a steady-state pressure drop obtained as a result of the coinjection period for foam composition comprising surfactant 3 in ionic solution W2 according to one or more embodiments.
Figure 6C:
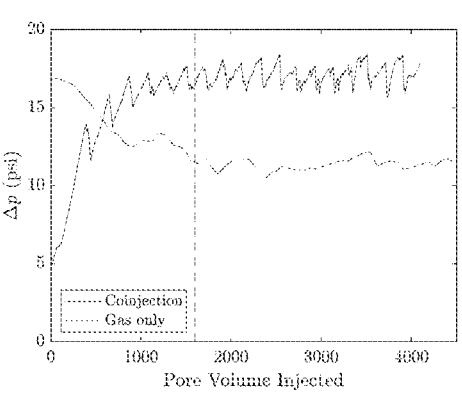
FIG. 6C graphically depicts a steady-state pressure drop obtained as a result of the coinjection period for foam composition comprising surfactant 3 in ionic solution W3 according to one or more embodiments.
Figure 6D:
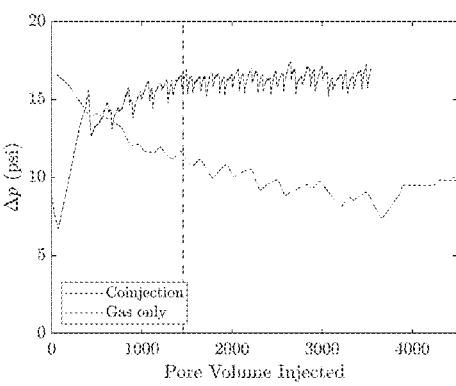
FIG. 6D graphically depicts a steady-state pressure drop obtained as a result of the coinjection period for foam composition comprising surfactant 3 in ionic solution W4 according to one or more embodiments.

Similarly, FIGS. 5A and 5B illustrate similar pressure drop behavior for a foam comprising a different surfactant sample, surfactant 2 in two different ionic medium W1, and W2. FIGS. 6A-D illustrate similar pressure drop behavior for a foam comprising a different surfactant sample, surfactant 3 in four different ionic mediums W1, W2, W3, and W4. In all cases above, the foam compositions comprised $CO_2$ at 70% foam quality in different aqueous solutions.

Figure 7A:
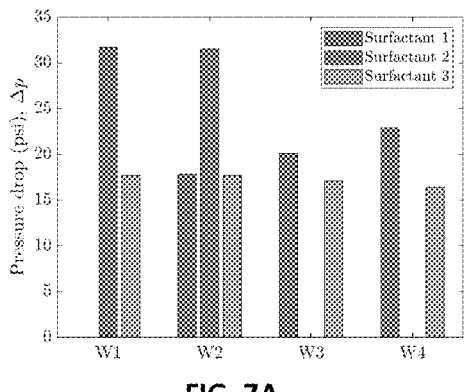
FIG. 7A graphically depicts steady-state pressure drop obtained as a result of the coinjection period for the different aqueous solutions according to one or more embodiments.
Figure 7B:
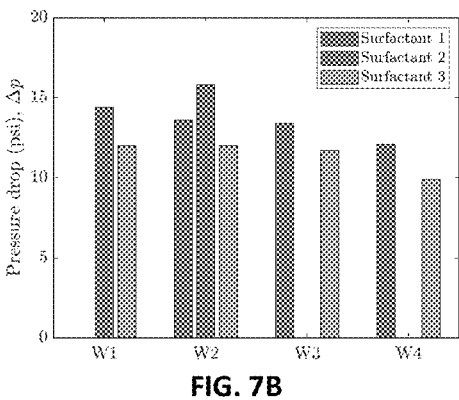
FIG. 7B graphically depicts steady-state pressure drop obtained as a result of the gas-only injection period for the different aqueous solutions according to one or more embodiments.

FIGS. 7A and 7B illustrate comparisons among the steady-state pressure drop values obtained after the coinjection period for the different aqueous solutions, W1, W2, W3, and W4 for the three different foams generated using three surfactants, surfactant 1, surfactant 2, and surfactant 3. These values are the pressure drop values typically used to compute the mobility reduction factor. For instance, surfactant 2 showed very similar pressure drop values when tested with the ionic solution, W1, and W2. Similar results were observed for surfactant 3. Even if there were some differences, the values were very small in absolute value that it may be challenging to determine the best result. Another measureable indicator for the stability of foam was the pressure drop value obtained after the gas-only injection period. These values for the different aqueous solutions used were reported in FIG. 7B. As illustrated, surfactant 1 reached a larger value for W2, followed by W3, and then W4. The divalent ions that comprised W2 seem to make the foam stronger using surfactant 2 than the monovalent ions in W1. The sulfate ions in W4 reached smaller steady-state pressure drop than other ions (W1, W2, and W3) for surfactant 3. The calcium ions (W2) gave the largest steady-state value of the pressure drop, which means after drying-out, drying out-educe the gas mobility the most among the solutions tested.

Figures 8A, 8B:
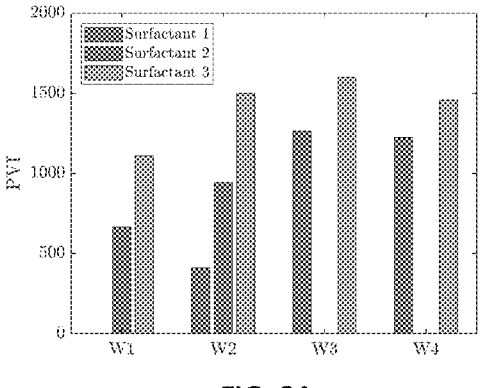
FIG. 8A graphically depicts pore volumes injected until steady-state is reached during the gas-only injection period for the different aqueous solutions according to one or more embodiments.
FIG. 8B graphically depicts oscillation measurements that are obtained from the steady-state period reached after gas-only injection for the different aqueous solutions according to one or more embodiments.

As shown in FIG. 8A, the pore volume of injection needed to reach the steady-state value following the gas-only injection period for the different aqueous solutions varied from surfactant to surfactant. For example, surfactant 1, in ionic solution of W3 or W4 outperformed W2 by extending the period of pore volume injection. Surfactant 2 results indicated that the foam compositions with surfactant 2 in the ionic solution of W2 outperformed the foam compositions with surfactant 2 in the ionic solution of W1. The results for surfactant 3 showed that divalent ions (W2, W3, and W4) extended this period when compared to monovalent ions (W1). Among the divalent ions ($Ca^{2+}$, $Mg^{2+}$, and $SO_4^{2-}$), the magnesium ion gave the longest time to reach the new steady-state value.

As shown in FIGS. 8B, the oscillatory behavior of the foams in the steady-state period following the gas-only injection also varied from surfactant to surfactant, and was dependent on the ionic medium. In order to deduce a meaningful measure from this value, the average value obtained from the oscillatory behavior was compared to the actual values, and the root mean squared error of this period was calculated. If there were no oscillations, the values in this period may be close to the mean value and, therefore, the root mean squared error (oscillation measure) would be close to zero. Conversely, if the values fluctuated during this period, then the oscillation measures may have large values. For example, surfactant 2 showed much larger oscillatory behavior than the other two surfactants, and W4 ionic medium showed the most oscillatory behavior for surfactants 1 and 3.

Embodiments of the present disclosure may provide at least one of the following advantages. The disclosed method incorporates other important parameters when determining a suitable surfactant from a group of surfactants. There are some shortcomings from considering only the MRF during surfactant selection. First, The MRF indicates only the maximum level at which the mobility could be reduced to but does not inform us about the time it would take to reach that level of reduction or how long this reduction would last. Second, due to the fact that MRF is measured from a single steady-state measurement, it is hard to unravel whether the level of stability that the foam system had reached. During foam flow, competition between generation and coalescence of lamellae make the foam system metastable. A system that fluctuates between stability and instability is undesired because it indicates that foam could collapse easily and thus does not allow enough time for fluid diversion to other unswept areas. Third, MRF measurements only consider the part of the generation without taking into account the subsequent part after surfactant injection had stopped. The disclosed method may be advantageous in overcoming the above limitations. The disclosed method may determine the dynamic behavior of foam in a porous medium, which is typically ignored in conventional methods. To one ordinary skilled in the art, it is known that there is a detergency aspect involved in a steam foam oil recovery process and the mobility control of the steam-containing fluid may not be the only factor when selecting a surfactant. However, no existing surfactant screening method utilizes techniques that enable them to compare the detergency aspect of surfactants when selecting them. The disclosed surfactant screening method translates the detergency aspect of surfactants by measuring the frequency and the magnitude of the oscillations after pure gas injection that can be observed during the steady-state period. The disclosed two-step method including a first co-injection and then a second pure gas injection is advantageous in determining parameters that are important. The disclosed surfactant screening method constrains the choice of the optimal surfactant by acquiring more data about the surfactant performance in comparison with current practices. The disclosed surfactant screening method studies the stability of foam for a given surfactant since it measures the frequency and magnitude of oscillation during the gas-only injection period. Unlike conventional screening methods, the disclosed surfactant screening method measures dynamic aspects of the resultant foam system.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method for secondary oil recovery, the method comprising:

screening multiple surfactants using a screening method comprising:

passing a foam composition comprising a surfactant through a porous media while measuring a pressure drop across the porous media until a first steady state pressure drop across the porous media is achieved;

measuring a first magnitude and a first frequency in an oscillation of the first steady state pressure drop;

injecting a gas through the porous media while measuring the pressure drop across the porous media until a second steady state pressure drop across the porous media is achieved;

measuring a second magnitude and a second frequency in an oscillation of the second steady state pressure drop;

determining a foam stability of the foam composition comprising the surfactant based on the first steady state pressure drop and the second steady state pressure drop by calculating a mobility reduction factor, and based on the first magnitude and first frequency of the oscillations of the first steady state pressure drop and the magnitude and second frequency of the oscillations of the second steady state pressure drop, wherein the foam stability is determined by an increased mobility reduction factor, a reduction in the magnitude and frequency of the oscillations, or both;

repeating the passing, measuring, injecting, measuring, and determining for additional foam compositions comprising the same or different surfactants;

injecting a foam composition into an oil-containing reservoir, wherein the foam composition is based on results of the screening and properties of the oil-containing reservoir.

2. A method of screening foam compositions for use in secondary oil recovery processes, the method comprising:

(i) passing a foam composition comprising a surfactant through a porous media while measuring a pressure drop across the media until a first steady state pressure drop across the porous media is achieved;

(ii) measuring a first magnitude and a first frequency in an oscillation of the first steady state pressure drop over a first period of time;

(iii) injecting a gas through the porous media while measuring the pressure drop across the porous media until a second steady state pressure drop across the porous media is achieved;

(iv) measuring a second magnitude and a second frequency in an oscillation of the second steady state pressure drop over a second period of time;

(v) determining a foam stability of the foam composition comprising the surfactant based on the first steady state pressure drop and the second steady state pressure drop by calculating a mobility reduction factor, and based on the magnitude and frequency of the oscillations of the second steady state pressure drop, wherein the foam stability is determined by an increased mobility reduction factor, a reduction in the magnitude and frequency of the oscillations, or both;

(vi) repeating the passing (i), measuring (ii), injecting (iii), measuring (iv), and determining (v) for additional foam compositions comprising the same or different surfactants.

3. The method of claim 2, further comprising measuring a volume of gas required to transition from the first steady state pressure drop to the second steady state pressure drop.

4. The method of claim 3, wherein the determining a foam stability is further based on the volume of gas required.

5. The method of claim 2, further comprising repeating the steps (i)-(vi) for the foam compositions across a second porous media having different properties than the porous media.

6. The method of claim 2, further comprising:

measuring a first gas saturation of the foam composition after reaching the first steady state, and a second gas saturation the foam composition after reaching the second steady state using an imaging device; and determining the foam stability of the foam composition comprising the surfactant based on the first gas saturation and the second gas saturation.

7. The method of claim 2, wherein the foam quality is in a range from 60 to 90%.

8. The method of claim 2, wherein the determining a foam stability is further based on the magnitude and frequency of the oscillations of the first steady state pressure drop.

9. The method of claim 2, further comprising:

using the selected surfactant to make a foamed composition; and injecting the foamed composition into an oil & gas reservoir for secondary recovery.

10. A method for secondary oil recovery, comprising:

measuring one or more properties of a formation including porosity and rock type, selecting a foam composition based on the screening as claimed in claim 2 and the one or more properties of the formation;

injecting the foam composition into the formation.

* * * * *